United States Patent
Cseri et al.

(10) Patent No.: US 12,487,977 B2
(45) Date of Patent: Dec. 2, 2025

(54) STORAGE LIFECYCLE CONTROL IN A DATABASE SYSTEM

(71) Applicant: Snowflake Inc., Bozeman, MT (US)

(72) Inventors: Istvan Cseri, Seattle, WA (US); Mayank Gupta, Seattle, WA (US); Kishore Udayashankar Kasi, San Jose, CA (US); Sukruth Komarla Sukumar, Bellevue, WA (US); Polita Paulus, Kirkland, WA (US); Saurin Shah, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 9 days.

(21) Appl. No.: 18/403,892

(22) Filed: Jan. 4, 2024

(65) Prior Publication Data

US 2025/0225110 A1 Jul. 10, 2025

(51) Int. Cl.
*G06F 16/215* (2019.01)
*G06F 16/11* (2019.01)
*G06F 16/16* (2019.01)

(52) U.S. Cl.
CPC .......... *G06F 16/215* (2019.01); *G06F 16/125* (2019.01); *G06F 16/162* (2019.01)

(58) Field of Classification Search
CPC ............................ G06F 16/125; G06F 16/162
USPC ....... 707/661, 662, 663, 664, 665, 666, 667, 707/668
See application file for complete search history.

(56) References Cited

U.S. PATENT DOCUMENTS

| | | | | |
|---|---|---|---|---|
| 6,044,402 A | * | 3/2000 | Jacobson | H04L 63/1408 709/227 |
| 6,108,677 A | * | 8/2000 | Kiuchi | G06F 16/93 707/999.1 |
| 6,662,177 B1 | * | 12/2003 | Martino | G06F 16/90328 |
| 8,029,627 B2 | * | 10/2011 | Gerster | C22C 38/04 148/309 |
| 2005/0198201 A1 | * | 9/2005 | Bohn | H04L 12/6418 709/218 |
| 2014/0067776 A1 | * | 3/2014 | Larson | G06F 16/1748 707/692 |
| 2014/0181047 A1 | * | 6/2014 | Pawar | G06F 11/1451 707/654 |
| 2014/0222780 A1 | * | 8/2014 | Wu | G06F 16/2428 707/722 |
| 2019/0065322 A1 | * | 2/2019 | Chakankar | G06F 16/27 |

* cited by examiner

*Primary Examiner* — Baoquoc N To
(74) *Attorney, Agent, or Firm* — Schwegman Lundberg & Woessner, P.A.

(57) ABSTRACT

Systems and methods are provided for controlling the deletion of data in a database system. The system receives input comprising a deletion criterion for a database system. The system applies the deletion criterion to a set of tables of the database system. The system determines that an individual portion of the set of tables satisfies the deletion criterion. In response to determining that the individual portion of the set of tables satisfies the deletion criterion, the system transfers the individual portion of the set of tables to a temporary storage system.

20 Claims, 8 Drawing Sheets

STORAGE LIFECYCLE CONTROL IN A DATABASE SYSTEM

TECHNICAL FIELD

Examples of the disclosure relate generally to data platforms and databases and, more specifically, to controlling the retention and deletion of data on the databases.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The accuracy and efficiency at which various operations can be performed are impacted by the schema associated with various rows/columns of the tables.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
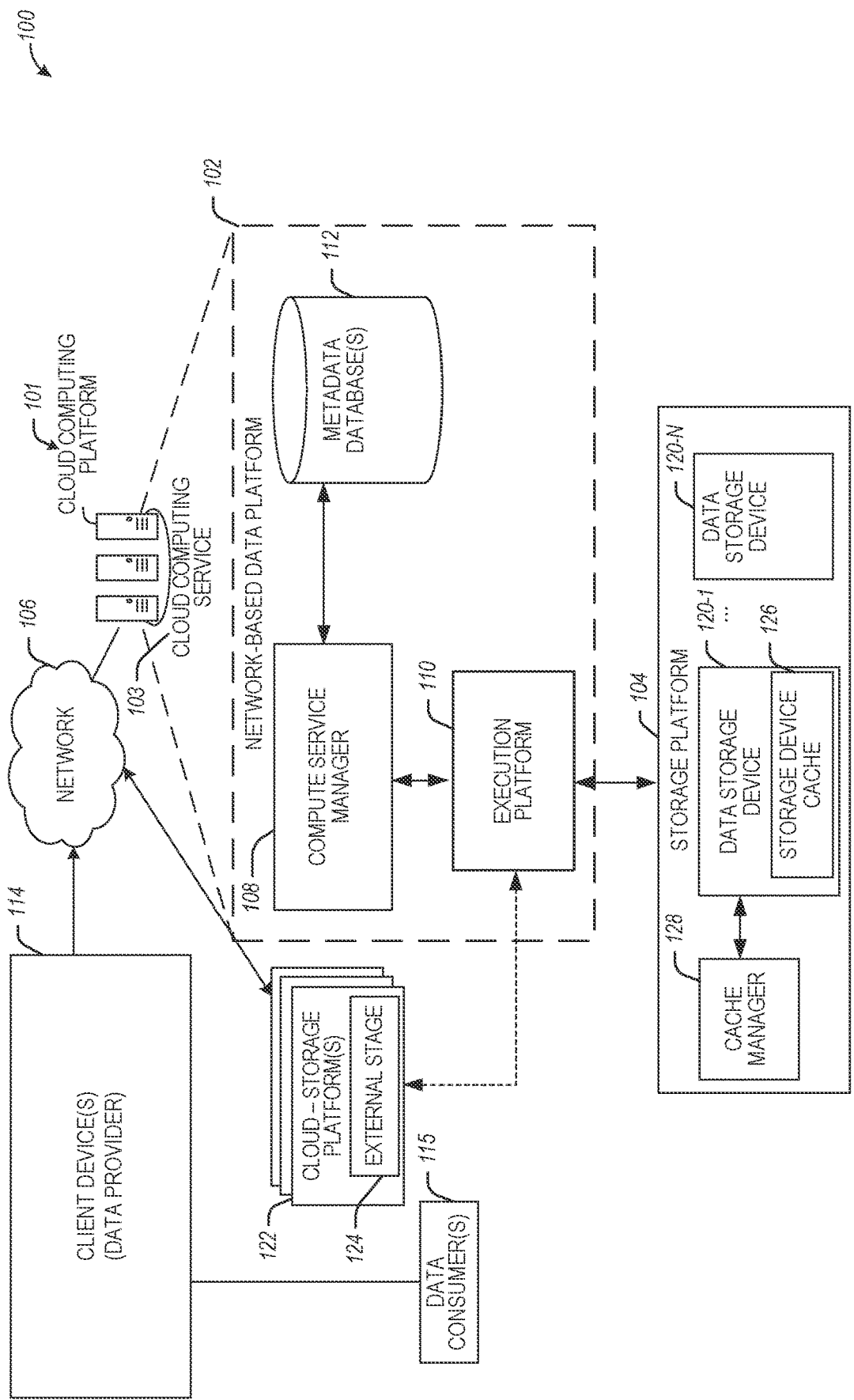
FIG. 1 illustrates an example computing environment that includes a network-based data platform, in accordance with some examples of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts (e.g., entities), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The entities that are allocated services on the data platform may be third parties relative to an entity that provides or hosts the data platform.

Users and/or executing processes that are associated with a given customer account may, via one or more types of clients, be able to cause data to be ingested into the database, and may also be able to manipulate the data, add additional data, remove data, run queries against the data, generate views of the data, and so forth. In an example implementation of a data platform, a given database is represented as an account-level object within a customer account, and the customer account may also include one or more other account-level objects such as users, roles, and/or the like. Furthermore, a given account-level database object may contain one or more objects such as tables, schemas, views, streams, tasks, and/or the like.

A given table may be organized as records (e.g., rows or a collection of rows) that each includes one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously, and blocks for different columns are row-aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

In conventional systems, users manually identify portions of a table that need to be deleted. This can be performed by defining a background task that deletes portions of the table. However, such tasks need to be redefined and recreated for each new table that the users create. This burdens the users with having to recall the specific parameters that were used to identify the portions to delete which requires navigating through multiple pages of information. This task can be incredibly time-consuming and prone to errors. Also, the tasks are usually specific to table names and, as the names of the tables or columns change, the deletion task will no longer operate properly. This can cause data to be retained unnecessarily which wastes storage resources and expenses in maintaining stale data. This conventional way of controlling the deletion of data in a database system causes a tremendous amount of confusion and is generally unhelpful.

Aspects of the present disclosure include systems, methods, and devices to address, among other problems, the aforementioned shortcomings of conventional data platforms by improving the way in which deletion policies are created and managed. Specifically, a deletion criterion can be defined by an administrator for an account. Then, certain users of the account can choose to apply the deletion criterion to certain sets of tables. Namely, a single deletion criterion can be defined and associated with multiple tables. This reduces the effort needed to manually create and apply multiple deletion policies for various tables. The deletion criterion is then associated and executed on the sets of tables periodically or according to some defined schedule in the background. When data is deleted from the tables, the data is transferred to temporary storage to enable the users to re-query the data as of an earlier specified time. Also, the administrators are provided with various information that identifies which deletion criteria have been defined and historical execution information associated with such deletion criteria. This substantially improves the way in which the deletion of data is handled in the database system and reduces the amount of resources dedicated to storing stale data.

In some examples, the disclosed techniques receive input comprising a deletion criterion for a database system. The disclosed techniques apply the deletion criterion to a set of tables of the database system. The disclosed techniques determine that an individual portion of the set of tables satisfies the deletion criterion. In response to determining that the individual portion of the set of tables satisfies the deletion criterion, the disclosed techniques transfer the individual portion of the set of tables to a temporary storage system. By performing these operations, the data platform increases utilization of execution node processing capability and avoids waste of resources and inefficient use of resources.

FIG. 1 illustrates an example computing environment 100 that includes a data platform in the example form of a network-based data platform 102, in accordance with some examples of the present disclosure. To avoid obscuring the example subject matter with unnecessary detail, various functional components that are not germane to conveying an understanding of the example subject matter have been omitted from FIG. 1. However, a skilled artisan will readily recognize that various additional functional components may be included as part of the computing environment 100 to facilitate additional functionality that is not specifically described herein. In other examples, the computing environment may comprise another type of network-based database system or a cloud data platform. For example, in some aspects, the computing environment 100 may include a cloud computing platform 101 with the network-based data platform 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—e.g., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts. The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user (entity) of one of the multiple client accounts (multiple entity accounts) supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers, entities, and providers. Such actions shall be understood to be performed concerning client device (or devices) 114 operated by such users (also referred to as entities). For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some examples, a user account object lists users authorized to access at least one target account (e.g., an account of a data provider or data consumer 115). In some examples, a roles account object configures privileges for the users to access the at least one target account. In some aspects, a warehouse object indicates compute resources (e.g., at least one virtual warehouse of the execution platform 110) for executing a workload associated with one or more databases of the data provider. In some examples, a resource monitor object configures monitoring usage of the compute resources.

The compute service manager 108 is also coupled to one or more metadata databases 112 that store metadata about various functions and aspects associated with the network-based data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
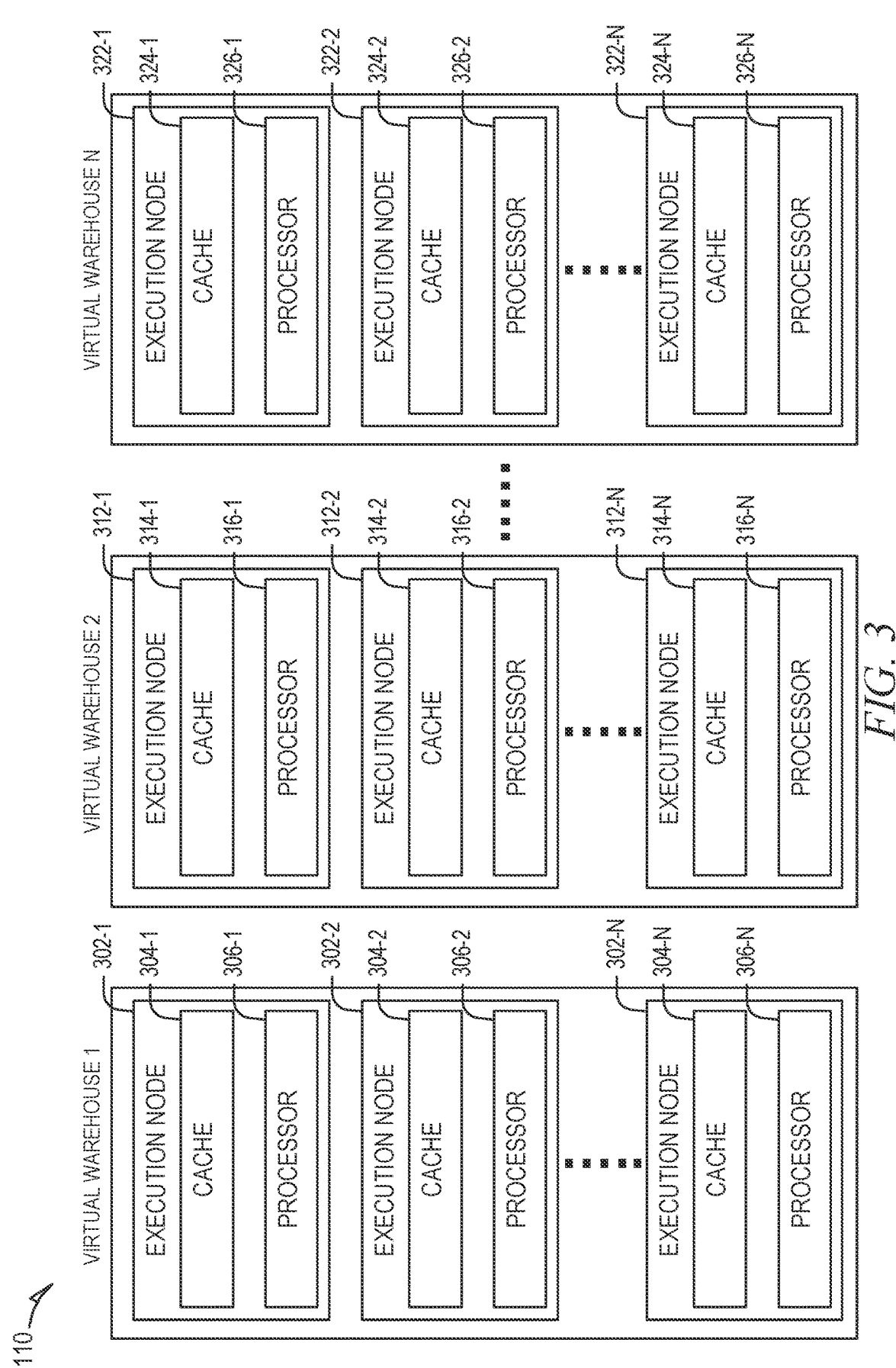
FIG. 3 is a block diagram illustrating components of an execution platform, in accordance with some examples of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some examples, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like.

In some examples, at least one storage device cache 126 (e.g., an internal cache) may reside on one or more of the data storage devices 120-1—120-N, and at least one external stage 124 may reside on one or more of the cloud storage platforms 122. In some examples, a single storage device cache 126 can be associated with all of the data storage devices 120-1—120-N so that the single storage device cache 126 is shared by and can store data associated with any one of the data storage devices 120-1—120-N. In some examples, each data storage device 120-1—120-N can include or implement a separate storage device cache 126. A cache manager 128 handles the transfer of data from the data storage devices 120-1—120-N to the storage device cache 126. The cache manager 128 handles the eviction of data from the storage device cache 126 to the respective associated data storage devices 120-1—120-N. The storage platform 104 can include one or more hard drives and/or can represent a plurality of hard drives distributed on a plurality of servers in a cloud computing environment.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described examples, the network-based data platform 102 is dynamic and supports regular changes to meet the current data processing needs.

During a typical operation, the network-based data platform 102 processes multiple jobs (e.g., operators of subplans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or RAM) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various examples, the execution platform 110 executes a query according to a query plan determined by the compute service manager 108. As part of executing the query, the execution platform 110 performs a table scan in which one or more portions of a database table are scanned to identify data that matches the query. More specifically, the database table can be organized into a set of files where each file comprises a set of blocks (or records), and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
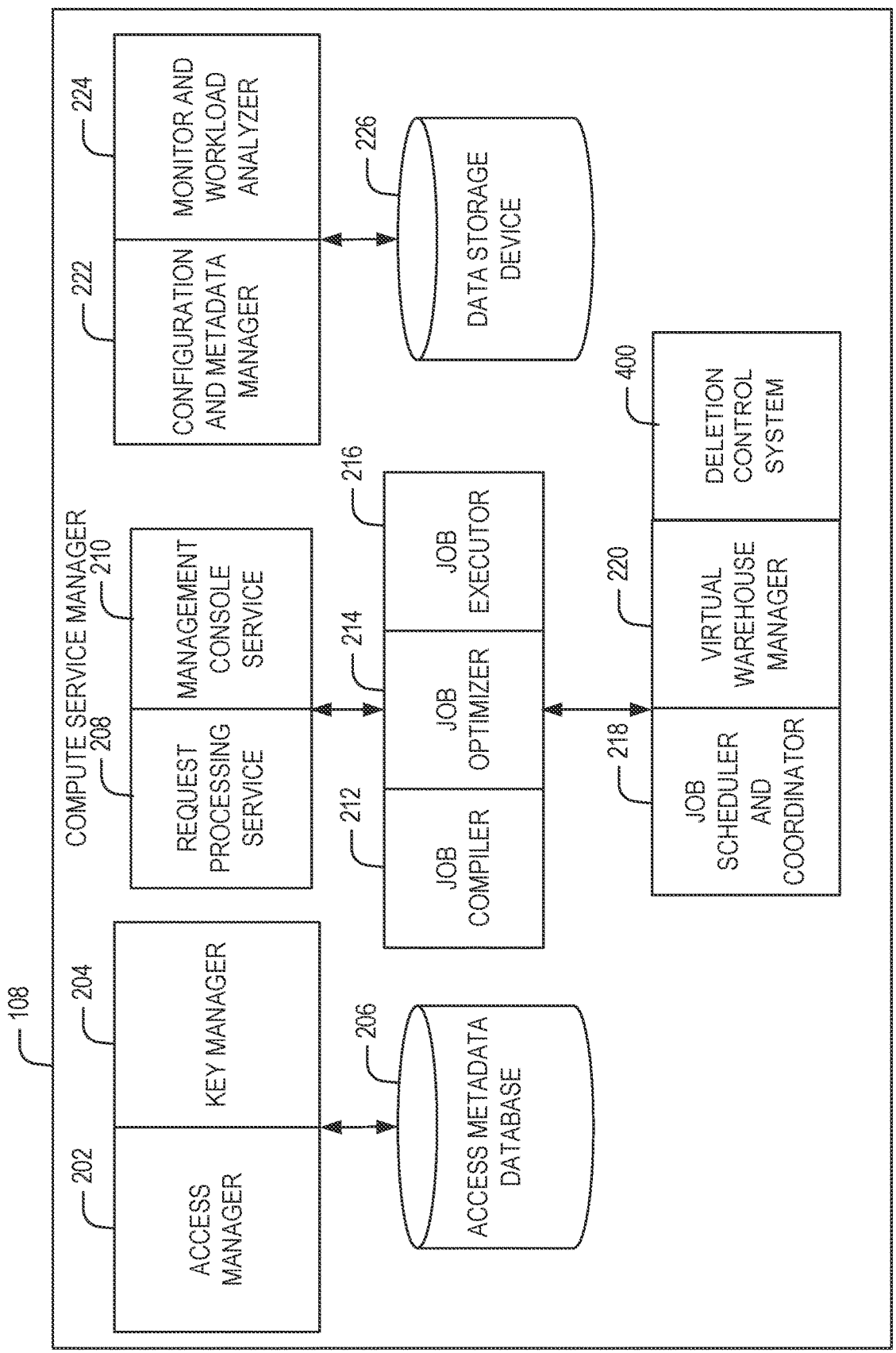
FIG. 2 is a block diagram illustrating components of a compute service manager, in accordance with some examples of the present disclosure.

FIG. 2 is a block diagram illustrating components of the compute service manager 108, in accordance with some examples of the present disclosure. As shown in FIG. 2, the compute service manager 108 includes an access manager 202 and a credential management system (or key manager) 204 coupled to an access metadata database 206, which is an example of the metadata database(s) 112. The compute service manager 108 also includes a deletion control system 400, discussed in more detail below in connection with FIG. 4.

Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system. The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an example, the job scheduler and coordinator 218 determine a priority for internal jobs that are scheduled by the compute service manager 108 with other "outside" jobs such as user queries that may be scheduled by other systems in the database but may utilize the same processing resources in the execution platform 110. In some examples, the job scheduler and coordinator 218 identify or assign particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110. In some cases, coordinator 218 handles the execution of a deletion operation or task to selectively delete portions of one or more tables according to one or more deletion criteria (e.g., deletion policies).

Additionally, compute service manager 108 includes configuration and metadata manager 222, which manages the information related to the data stored in the remote data storage devices and the local buffers (e.g., the buffers in execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, in accordance with some examples of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some examples, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some examples, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state. Each virtual warehouse can separately and independently host processes and allocate resources across multiple user accounts or multiple entities. In this way, each virtual warehouse can implement a multi-tenant data platform. In some cases, a first virtual warehouse can be associated with a first likelihood of service disruption while a second virtual warehouse can be associated with a second likelihood of service disruption. Certain user accounts to which resources of the first virtual warehouse are allocated can be notified about service disruptions if the first likelihood transgresses a specified threshold. Certain user accounts to which resources of the second virtual warehouse are allocated can be notified about service disruptions if the second likelihood transgresses the same or different specified threshold.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the cloud storage platform 104. The techniques described with respect to the cache manager 128 of the storage platform 104 (e.g., an HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
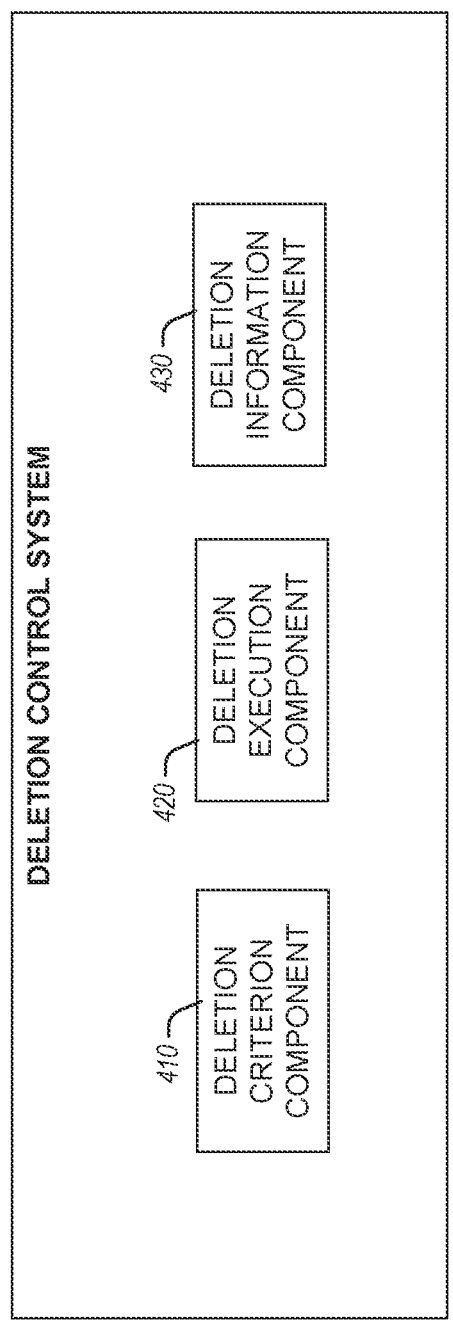
FIG. 4 is a block diagram of a deletion control system, in accordance with some examples of the present disclosure.

FIG. 4 is a block diagram illustrating an example of the deletion control system 400 which can be implemented by any of the virtual warehouses of the execution platform 110 (and/or by the compute service manager 108), in accordance with some examples of the present disclosure. The deletion control system 400 can include a deletion criterion component 410, a likelihood of deletion execution component 420 420, and a deletion information component 430. Deletion control system 400 allows an administrator of an account to define one or more deletion criteria (deletion policies). These one or more deletion criteria can then be processed by deletion tasks to selectively delete portions of tables to which the one or more deletion criteria are applied. For example, the one or more deletion criteria can specify a parameter for deleting data that is older than a certain age threshold, a parameter for deleting data corresponding to closed customer accounts, and/or a parameter for deleting one or more portions having metadata that satisfies some metadata attribute.

In some examples, deletion control system 400 receives input that includes a deletion criterion for a database system. Deletion control system 400 applies the deletion criterion to a set of tables of the database system. Deletion control system 400 determines that an individual portion of the set of tables satisfies the deletion criterion. In response to determining that the individual portion of the set of tables satisfies the deletion criterion, deletion control system 400 transfers the individual portion of the set of tables to a temporary storage system.

Specifically, deletion criterion component 410 can receive input from an administrator of an account that defines one or more deletion criteria. For example, a user interface can be presented on client device 114. The client device 114 can receive input from an administrator that defines various conditions or parameters that are used to test or determine whether to delete corresponding portions (e.g., columns and/or rows) of a table to which the deletion criterion is applied.

For example, the parameters can specify that data that is older than an age threshold needs to be deleted. In such cases, when a deletion task is executed, a creation date or a last access date associated with a given row or column of a table is obtained. A difference between the creation date or last access date and a current time can be computed. The difference can be compared with the age threshold. In response to determining that the difference transgresses the age threshold, the corresponding row or column is selected for deletion.

As another example, the parameters can specify that data corresponding to a closed account needs to be deleted. In such cases, when a deletion task is executed, a status associated with a given row or column of a table is obtained. The status can be compared with the closed account parameter. In response to determining that the status corresponds to the closed accounts parameter (e.g., satisfies the parameter or condition), the corresponding row or column is selected for deletion.

As another example, the parameters can specify that rows/columns associated with certain metadata need to be deleted. In such cases, when a deletion task is executed, metadata associated with a given row or column of a table is obtained. The obtained metadata can be compared with the certain metadata parameter of the deletion criterion. In response to determining that the metadata corresponds to the metadata parameter (e.g., satisfies the parameter or condition), the corresponding row or column is selected for deletion.

The input from the client device 114 of the administrator can also specify a set of privileges or access rights associated with the deletion criterion. The set of privileges or access rights can indicate which roles are permitted to apply the corresponding deletion criterion to a given table or portion of a database.

The deletion criterion component 410 can receive a request from a user to apply a given deletion criterion to a portion of a database (e.g., to a row or column of a table or set of tables). The deletion criterion component 410 can present a user interface on a client device 114 of the user. The user interface can list a set of deletion criteria that the user is eligible to select to apply. For example, the deletion criterion component 410 can obtain a set of access rights, privileges, and/or roles of the user. The deletion criterion component 410 can then search a predefined set of deletion criteria that an administrator previously defined for the account associated with the user. The deletion criterion component 410 can compare the set of access rights, privileges, and/or roles of the user to the set of privileges, access rights, and/or roles of each deletion criterion. In response to determining that the set of access rights, privileges, and/or roles of the user match or are indicated to be permitted by the set of privileges, access rights, and/or roles of an individual deletion criterion, the deletion criterion component 410 adds the corresponding deletion criterion to the list presented to the user on the client device 114. In response to determining that the set of access rights, privileges, and/or roles of the user match or are indicated to not be permitted by the set of privileges, access rights, and/or roles of an individual deletion criterion, the deletion criterion component 410 excludes the corresponding deletion criterion from the list presented to the user on the client device 114.

The deletion criterion component 410 receives input from the user which selects a particular deletion criterion from the list. The deletion criterion component 410 can receive further input from the user that specifies one or more rows/columns/tables to which the selected particular deletion criterion should be applied. In response to receiving the further input, the deletion criterion component 410 applies or associates the particular deletion criterion to the one or more rows/columns/tables corresponding to the account. The deletion criterion component 410 also stores an indication in a tracking table for the deletion criterion that identifies the one or more rows/columns/tables to which the deletion criterion has been applied. In similar ways, different users of a database account can selectively apply different predefined deletion criteria to rows/columns/tables selected by the users. Also, the tracking table can allow an administrator to monitor how the deletion criteria are used and to which one or more rows/columns/tables they have been applied on a deletion criterion by deletion criterion basis. This provides the administrator with greater control over the management of the deletion of data associated with an account.

The deletion execution component 420 operates various deletion tasks in the background. Specifically, the deletion execution component 420 can periodically execute a deletion task for each one or more rows/columns/tables to which a deletion criterion has been applied. For example, the deletion criterion can be applied to a first set of tables. The deletion execution component 420 can execute a deletion task that analyzes the data stored in the first set of tables to determine whether the data satisfies deletion parameters associated with the deletion criterion. In response to determining that a certain portion of the first set of tables (e.g., a row or set of rows or columns) satisfies the deletion parameters, the deletion execution component 420 executes a deletion operation on the certain portion of the first set of tables.

In some examples, the deletion execution component 420 can execute the deletion task every set period of time, such as every 12 hours or every 24 hours. In some cases, the deletion execution component 420 executes the deletion task at a first time. After the deletion execution component 420 completes executing the deletion task the first time, the deletion execution component 420 automatically schedules the deletion task to be executed at a second time which can be a threshold period of time (e.g., 12 hours) after the first time. In some examples, the deletion execution component 420 determines that the deletion task failed to successfully execute. In such cases, the deletion execution component 420 automatically schedules the deletion task to be executed again at another time which can be a threshold period of time from when the deletion task failed to successfully execute. The deletion execution component 420 can store the result of executing the deletion task in the tracking table for the deletion criterion. The result can specify whether or not the deletion criterion was successfully executed and/or which portions of the database were deleted or transferred in response to determining that the portions satisfy the parameters of the deletion criterion.

In some cases, the deletion execution component 420 permanently deletes the data stored in the certain portion of the first set of tables as part of the deletion operation. In some cases, the deletion execution component 420 transfers data stored in the certain portion of the first set of tables to a temporary storage system. In some cases, the deletion execution component 420 transfers the data stored in the certain portion of the first set of tables to an archive.

The temporary storage system can enable a user to query data as of an earlier date. For example, data can be transferred from a table at a certain time. That certain time can be stored in association with the data in the temporary storage system using a timestamp and then the data can be deleted from the table after the data is stored in the temporary storage system. The compute service manager 108 can receive a request to perform a database operation on data that is associated with an earlier time. Namely, if the compute service manager 108 receives a request to perform a query for the table without specifying the earlier time, the compute service manager 108 executes the request on the table which excludes the data that was transferred to the temporary storage system. If the compute service manager 108 receives an indication of an earlier time in the request, the compute service manager 108 accesses the temporary storage system and identifies any data stored in the temporary storage system that is associated with a timestamp that follows (is later) than the earlier time specified in the request. Data that is associated with a timestamp that precedes the earlier time specified in the request is excluded from being queried. In this way, a user can perform database operations on data that may have been transferred out of the database and stored in the temporary storage system if the user specifies a particular earlier time that is earlier than the time at which the data was moved to the temporary storage system.

In some examples, unlike the temporary storage system, database operations may not be performed on data stored in the archive. In order to perform operations on the data stored in the archive, a separate request to retrieve data stored in the archive may need to be processed. After the data is retrieved from the archived and moved to the temporary storage system or another storage location, a requested set of database operations can be performed on that data. In some examples, after data is stored in the temporary storage system for a threshold period of time (e.g., 30 days), the data is automatically and permanently deleted. In some examples, after data is stored in the temporary storage system for a threshold period of time (e.g., 30 days), the data is automatically transferred to the archive.

In some examples, the compute service manager 108 receives a request to replicate a database or one or more tables in the database. The compute service manager 108 can copy the data stored in the database or one or more tables in the database identified in the request to a new database or one or more tables in the database (e.g., the replicated database or one or more tables in the database). The compute service manager 108 can determine whether the database or one or more tables in the database have a deletion criterion applied. If so, the compute service manager 108 also applies the deletion criterion to the replicated database or one or more tables in the database. The deletion execution component 420 can determine whether the deletion task is being performed on a replicated database or one or more tables in the database. In such cases, the deletion execution component 420 prevents execution of the deletion task to prevent deleting data from the replicated database or one or more tables in the database. Namely, the deletion control system 400 can ensure that data is only deleted from a primary database or one or more tables in the database to which a deletion criterion is applied and is not deleted from any replicated database or one or more tables in the database.

Figure 5:
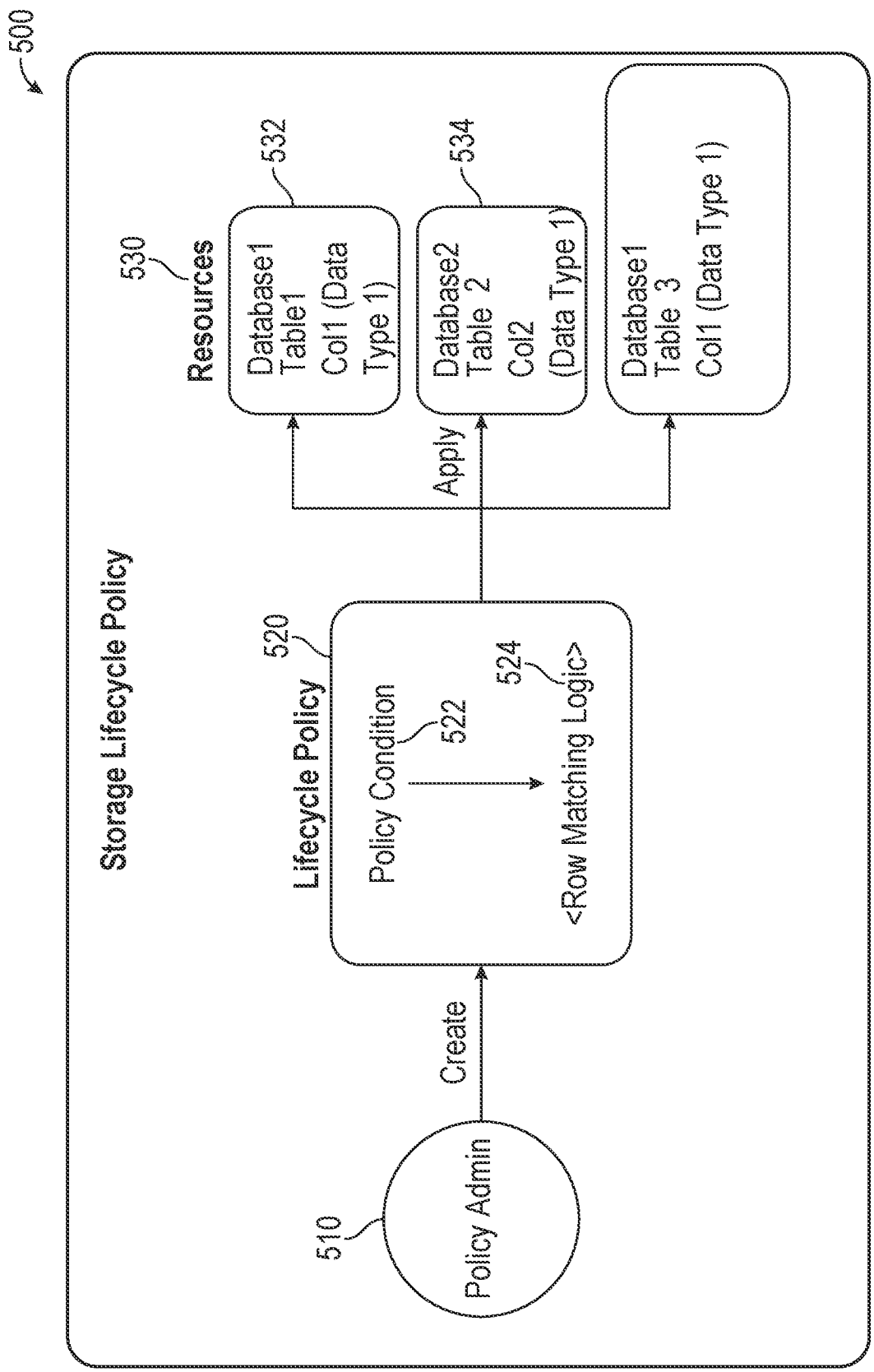
FIG. 5 is a block diagram of a deletion control system, in accordance with some examples of the present disclosure.

FIG. 5 is a block diagram of a deletion control system 500, in accordance with some examples of the present disclosure. The deletion control system 500 represents some or all portions of the deletion control system 400 in more or less detail. Specifically, the deletion control system 500 can include a policy administrator component 510. The policy administrator component 510 can perform similar functions as deletion criterion component 410. Namely, the policy administrator component 510 can be accessed by a client device 114 of an administrator. The policy administrator component 510 can receive input from the client device 114 of the administrator that defines or creates a deletion criterion (e.g., a deletion policy). The policy administrator component 510 stores the deletion criterion on the account of the administrator to enable users to selectively apply the deletion criterion to one or more database portions.

The lifecycle policy component 520 can handle executing deletion tasks including the deletion criterion defined by the policy administrator component 510. For example, the lifecycle policy component 520 can obtain one or more policy conditions 522 (e.g., parameters of the deletion criterion). The lifecycle policy component 520 can then access various rows/columns of a table to which the deletion criterion has been applied. The lifecycle policy component 520 can apply row matching logic 524 to determine whether the data stored in the accessed rows/columns satisfy the one or more policy conditions 522. For example, the lifecycle policy component 520 can access one or more database resources 530 (e.g., one or more database columns and/or rows). The lifecycle policy component 520 can apply the one or more policy conditions 522 to the one or more database resources 530 to determine whether to delete the corresponding portions of the one or more database resources 530. For example, the lifecycle policy component 520 can obtain a first database table 532. The lifecycle policy component 520 can determine whether a row/column of the first database table 532 satisfies parameters of the one or more policy conditions 522. If so, the lifecycle policy component 520 can transfer the row/column of the first database table 532 to a temporary storage system or permanently delete the row/column.

In parallel or after processing the first database table 532, the lifecycle policy component 520 can obtain a second database table 534. The lifecycle policy component 520 can determine whether a row/column of the second database table 534 satisfies parameters of the one or more policy conditions 522. If so, the lifecycle policy component 520 can transfer the row/column of the second database table 534 to a temporary storage system or permanently delete the row/column. In this way, the same one or more policy conditions 522 can be simultaneously, or sequentially, applied to multiple one or more database resources 530. This avoids having to define separate deletion criteria (which may be identical) separately for multiple database resources 530.

The deletion information component 430 can collect statistics and various other tracking information associated with various deletion criteria, such as in a tracking table. The deletion information component 430 can store information that indicates which deletion criteria have been defined by an administrator of an account. The deletion information component 430 can store information indicating to which tables or portions of the database deletion criteria have been applied. The deletion information component 430 can store information indicating results of executing various deletion tasks associated with the deletion criteria. The deletion information component 430 can also store an indication for each table, row, and/or column of the corresponding deletion criterion that is applied. This allows an administrator to review which portions of a database are associated with certain deletion criteria and also to review on a table-by-table basis which deletion criterion has been applied.

Figure 6:
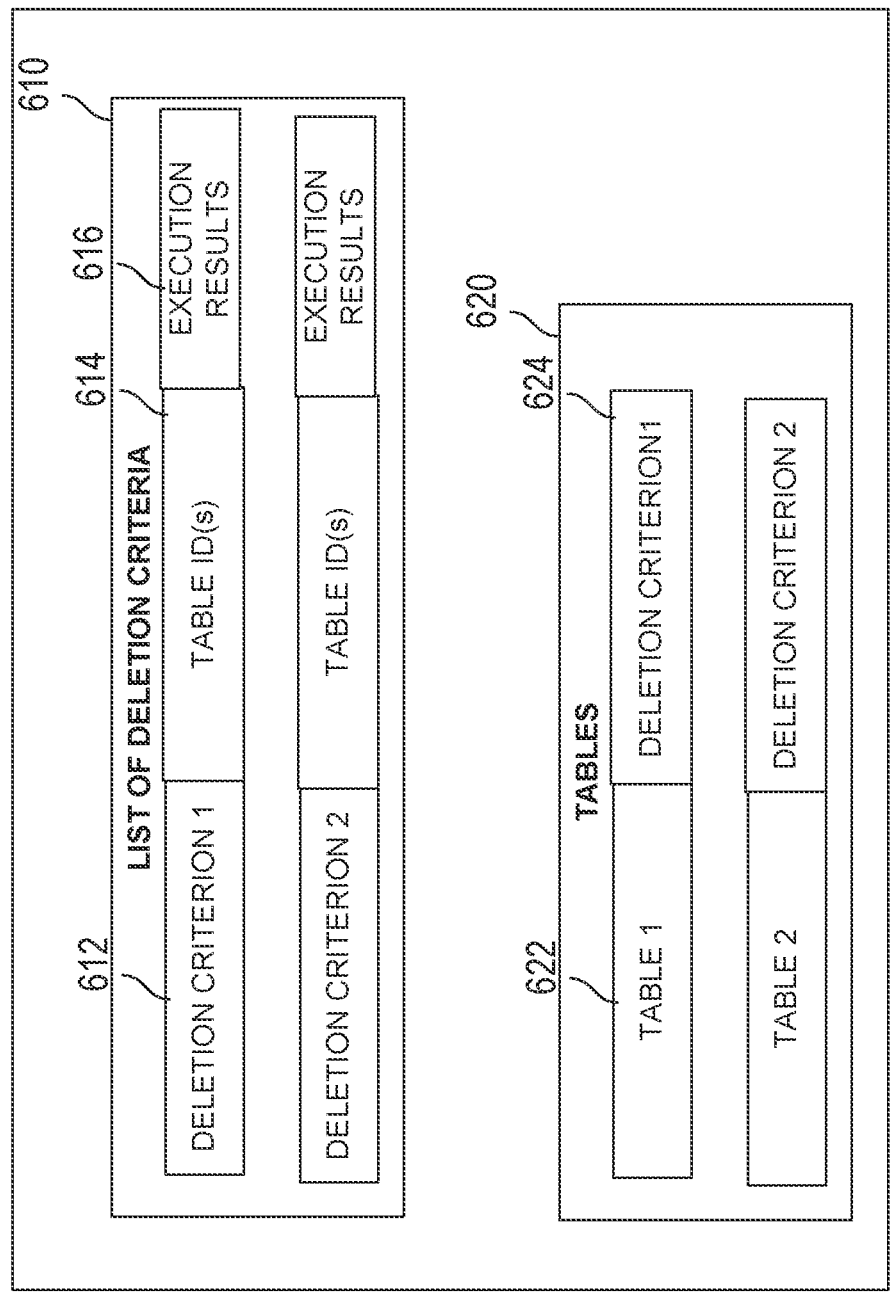
FIG. 6 is an illustrative output of the deletion control system, in accordance with some examples of the present disclosure.

FIG. 6 is an illustrative output of the deletion control system 400, in accordance with some examples of the present disclosure. For example, the deletion information component 430 can receive a request from an administrator via the client device 114 of the administrator to review information associated with various deletion criteria. In response, the deletion information component 430 presents a graphical user interface 600. The graphical user interface 600 can include a deletion criteria portion 610.

In some examples, the deletion criteria portion 610 can identify various deletion criteria that have been previously defined and associated with an account. For example, the deletion criteria portion 610 includes a first deletion criterion identifier 612 (e.g., a name of a deletion criterion specified by the administrator). The first deletion criterion identifier 612 can be associated with a list of table identifiers 614. The list of table identifiers 614 indicates one or more database portions (e.g., a set of tables, rows, and/or columns) to which the first deletion criterion identifier 612 has been applied. The deletion criteria portion 610 also includes an execution results field 616. The execution results field 616 specifies the results of executing deletion operations using the first deletion criterion identifier 612. For example, the execution results field 616 can indicate when the first deletion criterion identifier 612 was executed, the last time the first deletion criterion identifier 612 was executed, whether the first deletion criterion identifier 612 failed to successfully execute, what data satisfied the parameters of the first deletion criterion identifier 612, where the data that satisfied the parameters was transferred or whether the data was permanently deleted, and/or various other metrics.

The graphical user interface 600 can include a tables portion 620. The tables portion 620 lists various tables, rows, and/or columns associated with an account. For example, the tables portion 620 includes a first table identifier 622. The first table identifier 622 can include a deletion criterion indicator 624. The deletion criterion indicator 624 specifies one or more deletion criteria that have been applied to the table corresponding to the first table identifier 622. This allows the administrator to monitor and review which tables in the account have had which deletion criteria applied.

Figure 7:
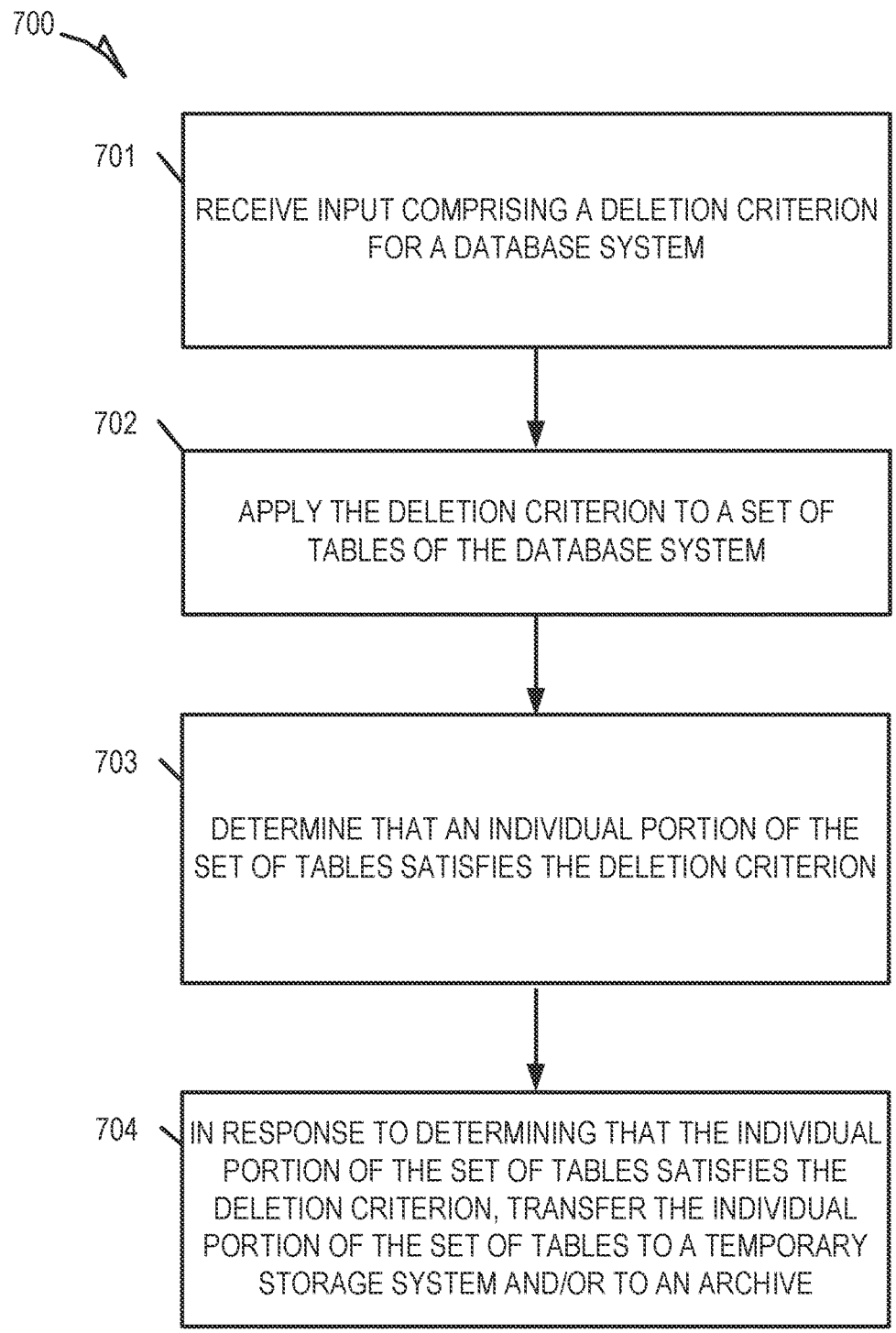
FIG. 7 is a flow diagram illustrating operations of the deletion control system, in accordance with some examples of the present disclosure.

FIG. 7 is a flow diagram illustrating operations 700 of the deletion control system 400, in accordance with some examples of the present disclosure. The operations 700 may be embodied in computer-readable instructions for execution by one or more hardware components (e.g., one or more processors) such that the operations of the operations 700 may be performed by components of data platform 102 such as the execution platform 110. Accordingly, the operations 700 is described below, by way of example with reference thereto. However, it should be appreciated that operations 700 may be deployed on various other hardware configurations and is not intended to be limited to deployment within the data platform 102. Depending on the example, an operation of the operations 700 may be repeated in different ways or involve intervening operations not shown. Though the operations of the operations 700 may be depicted and described in a certain order, the order in which the operations are performed may vary among examples, including performing certain operations in parallel or performing sets of operations in separate processes.

At operation 701, the deletion control system 400 receives input comprising a deletion criterion for a database system, as discussed above.

At operation 702, the deletion control system 400 applies the deletion criterion to a set of tables of the database system, as discussed above.

At operation 703, the deletion control system 400 determines that an individual portion of the set of tables satisfies the deletion criterion, as discussed above.

At operation 704, the deletion control system 400, in response to determining that the individual portion of the set of tables satisfies the deletion criterion, transfers the individual portion of the set of tables to a temporary storage system and/or to an archive, as discussed above.

Described implementations of the subject matter can include one or more features, alone or in combination as illustrated below by way of example.

Example 1: A system comprising: at least one hardware processor; and at least one memory storing instructions that cause the at least one hardware processor to execute operations comprising: receiving input comprising a deletion criterion for a database system; applying the deletion criterion to a set of tables of the database system; determining that an individual portion of the set of tables satisfies the deletion criterion; and in response to determining that the individual portion of the set of tables satisfies the deletion criterion, transferring the individual portion of the set of tables to a temporary storage system.

Example 2. The system of Example 1, the operations comprising: determining a time at which the individual portion was determined to satisfy the deletion criterion; and associating a timestamp comprising the time with the individual portion stored in the temporary storage system.

Example 3. The system of any one of Examples 1-2, the operations comprising: deleting the individual portion from the database system in response to transferring the individual portion to the temporary storage system.

Example 4. The system of any one of Examples 1-3, the operations comprising: determining that the individual portion has been stored in the temporary storage system for a threshold period of time; and transferring the individual portion from the temporary storage system to an archive in response to determining that the individual portion has been stored in the temporary storage system for the threshold period of time.

Example 5. The system of any one of Examples 1-4, the operations comprising: determining that the individual portion has been stored in the temporary storage system for a threshold period of time; and permanently deleting the individual portion from the temporary storage system in response to determining that the individual portion has been stored in the temporary storage system for the threshold period of time.

Example 6. The system of any one of Examples 1-5, wherein the individual portion comprises one or more rows of the set of tables.

Example 7. The system of any one of Examples 1-6, the operations comprising: receiving a query comprising a request to perform a database operation on data associated with a previous time; and in response to receiving the query, performing the database operation on the individual portion stored in the temporary storage system.

Example 8. The system of any one of Examples 1-7, the operations comprising: receiving input that identifies one or more columns or rows of the set of tables, wherein the deletion criterion is applied to the identified one or more columns or rows of the set of tables.

Example 9. The system of any one of Examples 1-8, wherein the deletion criterion comprises an age threshold, wherein determining the individual portion is determined to satisfy the deletion criterion in response to determining that data has been stored in the individual portion for a period of time that transgresses the age threshold, and wherein the data has not been accessed during the period of time.

Example 10. The system of any one of Examples 1-9, wherein the deletion criterion comprises a closed accounts parameter or metadata parameter, wherein determining the individual portion is determined to satisfy the deletion criterion in response to determining that data stored in the individual portion corresponds to closed accounts or has metadata matching the metadata parameter.

Example 11. The system of any one of Examples 1-10, wherein the deletion criterion comprises a set of permitted privileges set by an administrator, the operations comprising: receiving, from an account associated with an individual set of privileges, a request to apply the deletion criterion to one or more portions of the set of tables; determining whether the individual set of privileges matches the set of permitted privileges; and in response to determining that the individual set of privileges matches the set of permitted privileges, storing the deletion criterion in association with the one or more portions of the set of tables.

Example 12. The system of any one of Examples 1-11, the operations comprising: periodically executing the deletion criterion on the set of tables to determine whether any portion of the set of tables matches the deletion criterion.

Example 13. The system of any one of Examples 1-12, the operations comprising: performing a first task for executing the deletion criterion on the set of tables to determine whether any portion of the set of tables matches the deletion criterion at a current time; and after executing the deletion criterion on the set of tables, scheduling a second task for re-executing the deletion criterion on the set of tables at a future time.

Example 14. The system of any one of Examples 1-13, the operations comprising: receiving a request to access execution history associated with the deletion criterion; and in response to receiving the request, generating for display, in a graphical user interface, a list of times the deletion criterion has been executed in relation to the set of tables and results associated with each time the deletion criterion has been executed.

Example 15. The system of any one of Examples 1-14, the operations comprising: receiving a request to view application information associated with the deletion criterion; and in response to receiving the request, generating for display, in a graphical user interface, an identification of the set of tables to which the deletion criterion has been applied.

Example 16. The system of any one of Examples 1-15, the operations comprising: receiving a request to view deletion information associated with an individual table of the set of tables; and in response to receiving the request, generating for display, in a graphical user interface, one or more deletion criteria associated with the individual table.

Example 17. The system of any one of Examples 1-16, the operations comprising: generating for display, in a graphical user interface, a list of deletion criteria information associated with an account, the list of deletion criteria information comprising an indication of each deletion criterion associated with the account, a time at which the respective deletion criterion was created or modified, and identification of one or more tables to which the respective deletion criterion has been applied.

Example 18. The system of any one of Examples 1-17, the operations comprising: receiving a request to replicate an individual table of the set of tables to which the deletion criterion has been applied; generating a replicated table that comprises data stored in the individual table; and preventing execution of the deletion criterion on the replicated table.

Figure 8:
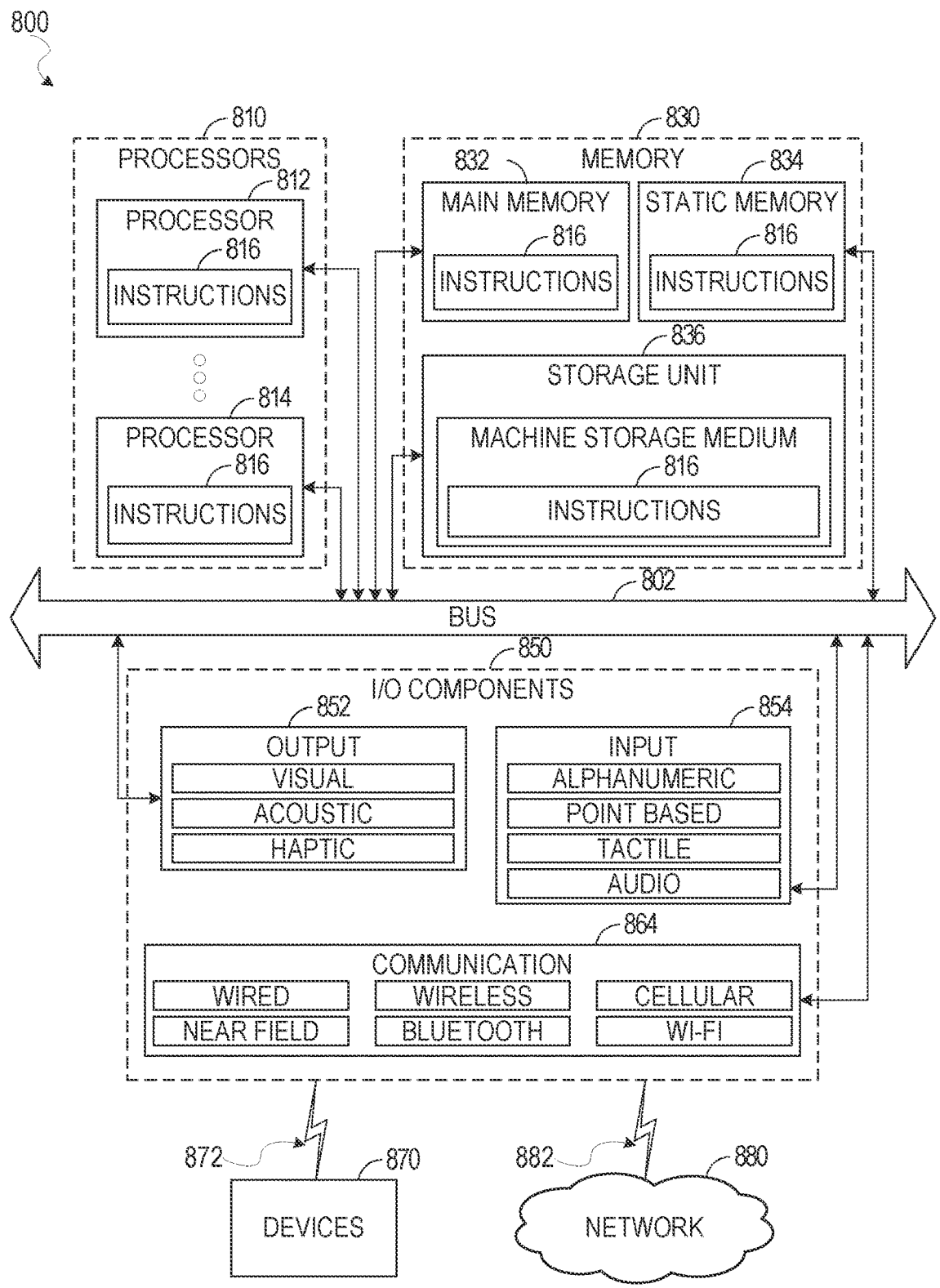
FIG. 8 illustrates a diagrammatic representation of a machine in the form of a computer system within which a set of instructions may be executed for causing the machine to perform any one or more of the methodologies discussed herein, in accordance with some examples of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., operations 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative examples, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the process or operations 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    at least one memory storing instructions that cause the at least one hardware processor to execute operations comprising:
    receiving, from a first user having administrator privileges, input comprising a set of deletion criteria for a database system;
    storing the set of deletion criteria in association with the database system;
    causing presentation of the set of deletion criteria in a user interface to a second user having a role with access rights to the set of deletion criteria;
    receiving, from the second user, a selection of an individual deletion criterion from the set of deletion criteria presented to the second user in the user interface;
    applying the individual deletion criterion to a set of tables of the database system, the individual deletion criterion being associated with multiple tables of the database system in response to receiving the selection of the individual deletion criterion;
    determining that an individual portion of the set of tables satisfies the individual deletion criterion; and
    in response to determining that the individual portion of the set of tables satisfies the individual deletion criterion, transferring the individual portion of the set of tables to a temporary storage system.

2. The system of claim 1, the operations comprising:
    determining a time at which the individual portion was determined to satisfy the individual deletion criterion; and
    associating a timestamp comprising the time with the individual portion stored in the temporary storage system.

3. The system of claim 1, the operations comprising:
    deleting the individual portion from the database system in response to transferring the individual portion to the temporary storage system.

4. The system of claim 1, the operations comprising:
    determining that the individual portion has been stored in the temporary storage system for a threshold period of time; and
    transferring the individual portion from the temporary storage system to an archive in response to determining that the individual portion has been stored in the temporary storage system for the threshold period of time.

5. The system of claim 1, the operations comprising:
    determining that the individual portion has been stored in the temporary storage system for a threshold period of time; and
    permanently deleting the individual portion from the temporary storage system in response to determining that the individual portion has been stored in the temporary storage system for the threshold period of time.

6. The system of claim 1, wherein the individual portion comprises one or more rows of the set of tables.

7. The system of claim 1, the operations comprising:
receiving a query comprising a request to perform a database operation on data associated with a previous time; and
in response to receiving the query, performing the database operation on the individual portion stored in the temporary storage system.

8. The system of claim 1, the operations comprising:
receiving input that identifies one or more columns or rows of the set of tables, wherein the individual deletion criterion is applied to the identified one or more columns or rows of the set of tables.

9. The system of claim 1, wherein the individual deletion criterion comprises an age threshold, wherein determining the individual portion is determined to satisfy the individual deletion criterion in response to determining that data has been stored in the individual portion for a period of time that transgresses the age threshold, and wherein the data has not been accessed during the period of time.

10. The system of claim 1, wherein the individual deletion criterion comprises a closed accounts parameter or metadata parameter, wherein determining the individual portion is determined to satisfy the individual deletion criterion in response to determining that data stored in the individual portion corresponds to closed accounts or has metadata matching the metadata parameter, wherein the individual portion of the set of tables is transferred to the temporary storage system in response to determining that the closed accounts parameter or metadata parameter of the individual portion corresponds to the deletion criterion.

11. The system of claim 1, wherein the individual deletion criterion comprises a set of permitted privileges set by an administrator, the operations comprising:
receiving, from an account associated with an individual set of privileges, a request to apply the individual deletion criterion to one or more portions of the set of tables;
determining whether the individual set of privileges matches the set of permitted privileges; and
in response to determining that the individual set of privileges matches the set of permitted privileges, storing the individual deletion criterion in association with the one or more portions of the set of tables.

12. The system of claim 1, the operations comprising:
periodically executing the individual deletion criterion on the set of tables to determine whether any portion of the set of tables matches the individual deletion criterion.

13. The system of claim 1, the operations comprising:
performing a first task for executing the individual deletion criterion on the set of tables to determine whether any portion of the set of tables matches the individual deletion criterion at a current time; and
after executing the individual deletion criterion on the set of tables, scheduling a second task for re-executing the deletion criterion on the set of tables at a future time.

14. The system of claim 1, the operations comprising:
receiving a request to access execution history associated with the individual deletion criterion; and
in response to receiving the request, generating for display, in a graphical user interface, a list of times the individual deletion criterion has been executed in relation to the set of tables and results associated with each time the individual deletion criterion has been executed.

15. The system of claim 1, the operations comprising:
obtaining a set of access rights, privileges, and roles of the second user;
comparing the set of access rights, privileges, and roles of the second user to a set of privileges, access rights, and roles associated with each deletion criterion in the set of deletion criteria;
in response to determining that the set of access rights, privileges, and roles of the second user match or are permitted by the set of privileges, access rights, and roles associated with a particular deletion criterion, including the particular deletion criterion in the set of deletion criteria presented to the second user in the user interface; and
in response to determining that the set of access rights, privileges, and roles of the second user do not match or are not permitted by the set of privileges, access rights, and roles associated with a particular deletion criterion, excluding the particular deletion criterion from the set of deletion criteria presented to the second user in the user interface.

16. The system of claim 1, the operations comprising:
receiving a request to view deletion information associated with an individual table of the set of tables; and
in response to receiving the request, generating for display, in a graphical user interface, one or more deletion criteria associated with the individual table.

17. The system of claim 1, the operations comprising:
generating for display, in a graphical user interface, a list of deletion criteria information associated with an account, the list of deletion criteria information comprising an indication of each deletion criterion associated with the account, a time at which the respective deletion criterion was created or modified, and identification of one or more tables to which the respective deletion criterion has been applied.

18. The system of claim 1, the operations comprising:
receiving a request to replicate an individual table of the set of tables to which the individual deletion criterion has been applied;
generating a replicated table that comprises data stored in the individual table; and
preventing execution of the individual deletion criterion on the replicated table.

19. A method comprising:
receiving, by at least one hardware processor, from a first user having administrator privileges, input comprising a set of deletion criteria for a database system;
storing the set of deletion criteria in association with the database system;
causing presentation of the set of deletion criteria in a user interface to a second user having a role with access rights to the set of deletion criteria;
receiving, from the second user, a selection of an individual deletion criterion from the set of deletion criteria presented to the second user in the user interface;
applying the individual deletion criterion to a set of tables of the database system, the individual deletion criterion being associated with multiple tables of the database system in response to receiving the selection of the individual deletion criterion;
determining that an individual portion of the set of tables satisfies the individual deletion criterion; and in response to determining that the individual portion of the set of tables satisfies the individual deletion criterion, transferring the individual portion of the set of tables to a temporary storage system.

20. A non-transitory computer-storage medium comprising instructions that, when executed by at least one processor of a machine, configure the machine to perform operations comprising:

receiving, from a first user having administrator privileges, input comprising a set of deletion criteria for a database system;

storing the set of deletion criteria in association with the database system;

causing presentation of the set of deletion criteria in a user interface to a second user having a role with access rights to the set of deletion criteria;

receiving, from the second user, a selection of an individual deletion criterion from the set of deletion criteria presented to the second user in the user interface;

applying the individual deletion criterion to a set of tables of the database system, the individual deletion criterion being associated with multiple tables of the database system in response to receiving the selection of the individual deletion criterion;

determining that an individual portion of the set of tables satisfies the individual deletion criterion; and in response to determining that the individual portion of the set of tables satisfies the individual deletion criterion, transferring the individual portion of the set of tables to a temporary storage system.

* * * * *